United States Patent Office 3,424,797
Patented Jan. 28, 1969

3,424,797
PROCESS FOR PRODUCING DIFLUORAMINO-TRIFLUOROMETHANE
Douglas Dybvig, St. Paul, Minn., assignor, by mesne assignments, to the United States of America as represented by the Secretary of the Navy
No drawing. Filed Apr. 25, 1966, Ser. No. 546,473
U.S. Cl. 260—583                3 Claims
Int. Cl. C07c 85/12, 87/08, 87/22

The invention described herein may be manufactured and used by or for the Government of the United States for governmental purposes without the palyment of any royalties thereon or therefor.

This invention is directed to a novel chemical synthesis and more particularly to a process for producing difluoraminotrifluoromethane.

Difluoraminotrifluoromethane, which may be utilized either as an oxidizer; e.g., in propellants, as a physiologically active agent or as a precursor to trifluoromethylenimine via a reductive defluorination reaction, has been produced by numerous processes including the fluorination of potassium ferricyanide, but all of these processes resulted in low yields that were badly contaminated with byproducts.

Accordingly, it is an object of this invention to provide a new process for producing difluoroaminotrifluoromethane.

It is another object of this invention to produce the above product in a high yield without excessive contamination.

These and other objects will become more readily apparent from reading the following detailed description of the invention.

The objects of this invention are accomplished by directly fluorinating potassium cyanide with gaseous fluorine to produce difluoraminotrifluoromethane. The fluorination may be effected either at room temperature or temperatures above or below room temperature; e.g., equally good results are obtained at both room temperature and −20° C., to produce difluoraminotrifluoromethane in good yields, above 40% in short reaction times. The difluoraminotrifluoromethane produced may be separated from unreacted fluorine by condensation and then separated from other condensed gases by gas-liquid chromatography.

The following example is illustrative of the invention and is not to be construed as limiting it in any manner.

A glass U-tube of potassium cyanide measuring approximately 0.5 x 6 mm. was flushed with dry nitrogen gas, evacuated, and 1.7 mole of pure fluorine was swept over the bed into an evacuated glass bulb at room temperature. The tube was immersed in liquid nitrogen and the condensible products were removed from unreacted fluorine. The difluoraminotrifluoromethane produced by the fluorination was then separated from the other condensed gases by gas-liquid chromatography using as the stationary phase Kel-F Oil 8126. The yield of difluoraminotrifluoromethane which was identified by infrared analysis, was 41% based on fluorine consumed.

The above reaction was repeated at −20° C. and the same results were obtained.

The primary advantage of the process of this invention over previous processes for producing difluoraminotrifluoromethane is that it produces a product that is not highly contaminated with inseparable byproducts, thus permitting the isolation of a pure product in high yield.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:
1. A process for producing difluoraminotrifluoromethane which comprises, fluorinating potassium cyanide with gaseous fluorine.
2. The process of claim 1 wherein said fluorination is performed at about room temperature.
3. The process of claim 1 wherein said fluorination is performed at about −20° C.

References Cited
UNITED STATES PATENTS
3,346,639   10/1967   Wiesboeck _____ 260—583

OTHER REFERENCES
Emeleus et al.: Advances in Inorganic Chemistry and Radiochemistry, vol. 3, Academic Press Inc., New York, 1961, pp. 356 to 359.

CHARLES B. PARKER, *Primary Examiner.*
R. L. RAYMOND, *Assistant Examiner.*

U.S. Cl. X.R.
260—566; 149—109